US012345075B2

(12) United States Patent
Chen et al.

(10) Patent No.: US 12,345,075 B2
(45) Date of Patent: Jul. 1, 2025

(54) FURNITURE ASSEMBLY AND INTERLOCK KIT THEREOF

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shih-Lung Huang, Kaohsiung (TW); Yi-Syuan Jhao, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 124 days.

(21) Appl. No.: 18/381,183

(22) Filed: Oct. 18, 2023

(65) Prior Publication Data

US 2024/0418013 A1 Dec. 19, 2024

(30) Foreign Application Priority Data

Jun. 14, 2023 (TW) ................................ 112122513

(51) Int. Cl.

| | |
|---|---|
| ***E05B 65/464*** | (2017.01) |
| ***A47B 97/00*** | (2006.01) |
| ***E05B 65/463*** | (2017.01) |

(52) U.S. Cl.

CPC .......... *E05B 65/464* (2013.01); *E05B 65/463* (2013.01); *A47B 2097/008* (2013.01)

(58) Field of Classification Search

CPC .... E05B 65/462; E05B 65/463; E05B 65/464; A47B 88/50; A47B 2097/008; A47B 2210/0086

See application file for complete search history.

(56) References Cited

U.S. PATENT DOCUMENTS

| | | | |
|---|---|---|---|
| 4,925,257 | A | 5/1990 | Frederiksen |
| 6,779,855 | B2 | 8/2004 | Hoffman |

(Continued)

FOREIGN PATENT DOCUMENTS

| | | | | | |
|---|---|---|---|---|---|
| CN | 112932119 A | * | 6/2021 | ............. | A47B 88/40 |
| CN | 218219613 U | * | 1/2023 | ........... | A47B 88/443 |

(Continued)

*Primary Examiner* — Andrew Roersma

(74) *Attorney, Agent, or Firm* — Winston Hsu

(57) ABSTRACT

A furniture assembly is provided and includes a cabinet body, a drawer and an interlock kit. The interlock kit includes a first fitting member, a second fitting member and an interlock mechanism. The first fitting member is detachably mounted on the cabinet body and has a first predetermined height. The second fitting member is detachably mounted on the drawer and has a second predetermined height. A predetermined gap is defined by a difference between the first predetermined height and the second predetermined height. The interlock mechanism is arranged on the first fitting member. The second fitting member can always be moved by the drawer to cause the interlock mechanism to be operated normally as along as the second fitting member is mounted at a position within a mounting range defined by the predetermined gap and a position of the first fitting member. Besides, a related interlock kit is also provided.

20 Claims, 14 Drawing Sheets

(56) References Cited

U.S. PATENT DOCUMENTS

| | | | | |
|---|---|---|---|---|
| 7,320,507 | B2 | 1/2008 | White | |
| 7,484,817 | B2 | 2/2009 | Hoffman | |
| 7,637,576 | B2 * | 12/2009 | Sevillano Gil | E05B 65/464 312/221 |
| 2007/0040484 | A1 * | 2/2007 | Huang | E05B 65/464 312/221 |
| 2008/0074017 | A1 * | 3/2008 | Ruan | E05B 65/464 312/215 |
| 2024/0081528 | A1 * | 3/2024 | Xu | E05B 65/464 |
| 2024/0279963 | A1 * | 8/2024 | Zhan | E05B 65/464 |

FOREIGN PATENT DOCUMENTS

| | | | | | |
|---|---|---|---|---|---|
| CN | 218355199 | U | * | 1/2023 | |
| CN | 218390326 | U | * | 1/2023 | |
| CN | 218438803 | U | * | 2/2023 | |
| CN | 116058610 | A | * | 5/2023 | A47B 88/40 |
| GB | 2455550 | A | * | 6/2009 | E05B 65/464 |
| JP | 2002-527167 | A | | 8/2002 | |
| JP | 2005-504905 | A | | 2/2005 | |
| JP | 2007-98000 | A | | 4/2007 | |
| JP | 3173757 | U | | 2/2012 | |
| WO | 00/22266 | A1 | | 4/2000 | |
| WO | 03/031753 | A1 | | 4/2003 | |

* cited by examiner

FURNITURE ASSEMBLY AND INTERLOCK KIT THEREOF

BACKGROUND OF THE INVENTION

1. Field of the Invention

The present invention relates to a furniture product, and more specifically, to a furniture assembly with an interlock function and having a tolerance for assembly error and an interlock kit thereof.

2. Description of the Prior Art

With development of the industrial technology, there are various furniture products having interlock functions available in the market. As for a cabinet system, the cabinet system usually includes a cabinet body and a plurality of drawers, wherein when one of the plurality of drawers is opened relative to the cabinet body, the other of the plurality of drawers is locked for preventing falling of the cabinet body caused by two or more drawers being opened at the same time. Besides, the cabinet system usually further includes a plurality of slide rail assemblies mounted on the cabinet body and for supporting the plurality of the drawers.

For example, in U.S. Pat. No. 4,925,257, it discloses a cabinet system including a cabinet body and a plurality of drawers, e.g., a first drawer and a second drawer, arranged on the cabinet body. Each of the first drawer and the second drawer can be selectively moved between an opened position and a closed position relative to the cabinet body. The cabinet system further includes a locking rod movably mounted on the cabinet body and a cooperating structure configured to cooperate with the locking rod for preventing the first drawer and the second drawer from being opened at the same time.

However, in order to meet various requirements, it becomes an important topic to provide an improved furniture product.

SUMMARY OF THE INVENTION

It is an objective of the present invention to provide a furniture assembly with an interlock function and having a tolerance for assembly error and an interlock kit thereof.

According to an aspect of the present invention, a furniture assembly includes a cabinet body, a drawer and an interlock kit. The drawer is displaceable relative to the cabinet body along a longitudinal direction. The interlock kit includes a first fitting member, a second fitting member, an auxiliary device and interlock mechanism. The first fitting member is detachably mounted on the cabinet body. The first fitting member includes a first wall, a second wall and a middle wall connected between the first wall and the second wall. The first wall, the second wall and the middle wall cooperatively define a space of the first fitting member, and a first predetermined height is defined by a distance between the first wall and the second wall along a height direction. The second fitting member is detachably mounted on the drawer, and the second fitting member has a second predetermined height along the height direction. The auxiliary device is arranged on the first fitting member. The auxiliary device includes a base, a working member and an auxiliary member. The base is mounted inside the space of the first fitting member. The working member is movable relative to the base. The auxiliary member is movable relative to the base. The interlock mechanism is arranged on the first fitting member. The interlock mechanism includes at least one locking member. A predetermined gap is defined by a difference between the first predetermined height and the second predetermined height. When the second fitting member is mounted on the drawer at a mounting position within a mounting range defined by the predetermined gap and a position of the first fitting member and the drawer is displaced from a retracted position toward an extended position, the second fitting member drives the working member to move from a first working position to a second working position, so as to drive the auxiliary member to move from a first auxiliary position to a second auxiliary position to retain the at least one locking member at a locking position.

According to another aspect of the present invention, a furniture assembly includes a cabinet body, a drawer and an interlock kit. The drawer is displaceable relative to the cabinet body. The interlock kit includes a first fitting member, a second fitting member, an auxiliary device and an interlock mechanism. The first fitting member is arranged on the cabinet body. The second fitting member is detachably mounted on the drawer. The second fitting member includes an actuating part. The auxiliary device is arranged on the first fitting member. The auxiliary device includes a base, a working member and an auxiliary member. The working member is movable relative to the base. The working member includes a working part. The auxiliary member is movable relative to the base. The interlock mechanism is arranged on the first fitting member. The interlock mechanism includes at least one locking member. An extending length of the actuating part along a height direction is different from an extending length of the working part along the height direction for allowing the second fitting member to be mounted on the drawer at one of a first mounting position and a second mounting position, so as to locate the actuating part at a position corresponding to the working part. During a displacement of the drawer from a retracted position toward an extended position, the actuating part abuts against the working part for driving the working member to move from a first working position to a second working position, so as to drive the auxiliary member to move from a first auxiliary position to a second auxiliary position to retain the at least one locking member at a locking position.

According to another aspect of the present invention, an interlock kit includes a first fitting member, a second fitting member, an auxiliary device and an interlock mechanism. The first fitting member has a first predetermined dimension. The second fitting member has a second predetermined dimension. The auxiliary device is arranged on the first fitting member. The auxiliary device includes an auxiliary member. The interlock mechanism is arranged on the first fitting member. A predetermined gap is defined by a difference between the first predetermined dimension and the second predetermined dimension. When the second fitting member is mounted on the drawer at a mounting position within a mounting range defined by the predetermined gap and a position of the first fitting member and the second fitting member is moved relative to the first fitting member along a predetermined direction, the auxiliary member is driven to move from a first auxiliary position to a second auxiliary position to retain the interlock mechanism in a locking state.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The members of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
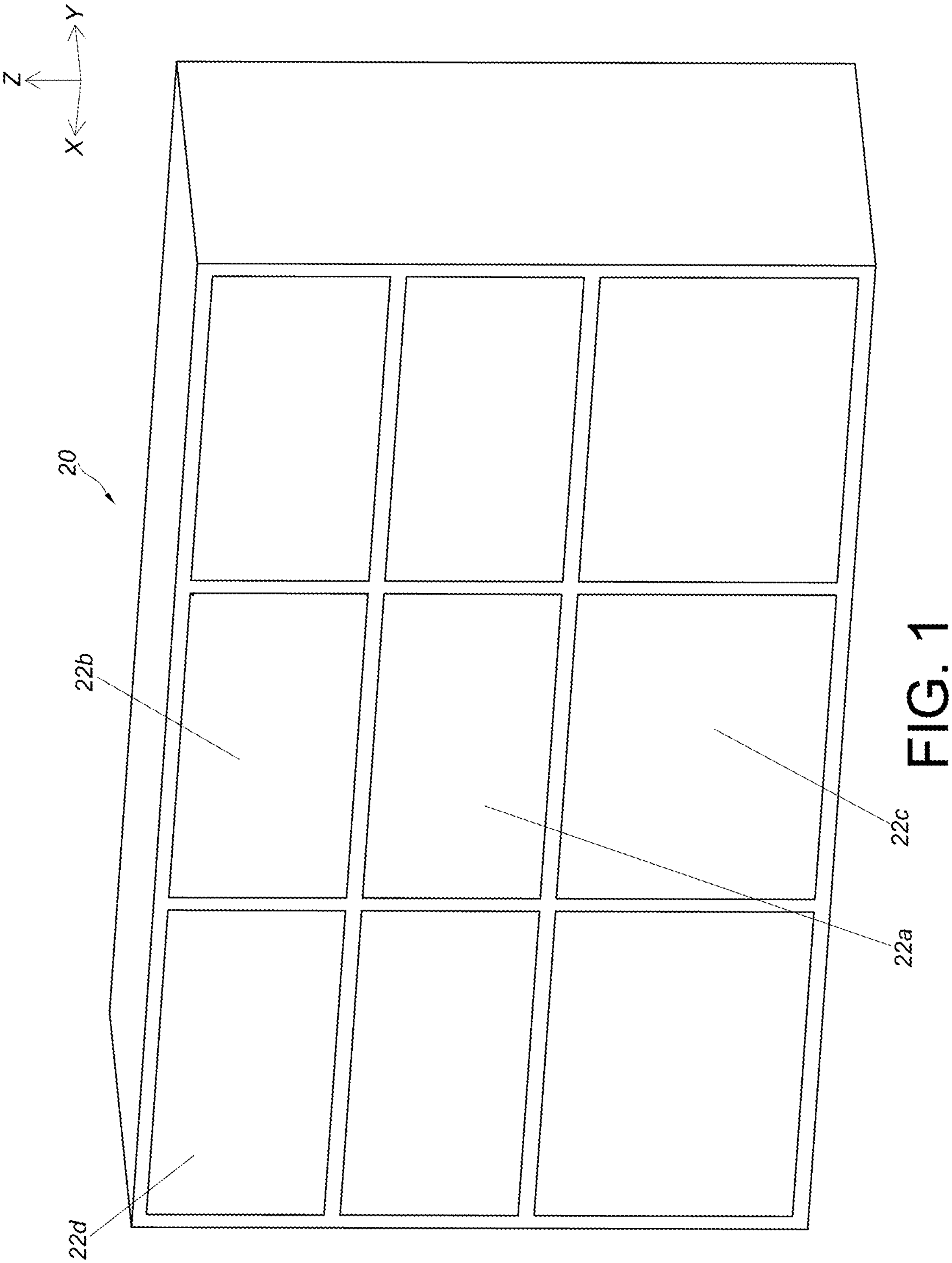
FIG. 1 is a diagram of a furniture assembly according to an embodiment of the present invention.

As shown in FIG. 1, a furniture assembly includes a cabinet body 20 and a plurality of drawers, e.g., a first drawer 22*a*, a second drawer 22*b*, a third drawer 22*c* and a fourth drawer 22*d*, arranged on the cabinet body 20 along a vertical direction and/or a transverse direction and displaceable relative to the cabinet body 20 along a longitudinal direction.

Figure 2:
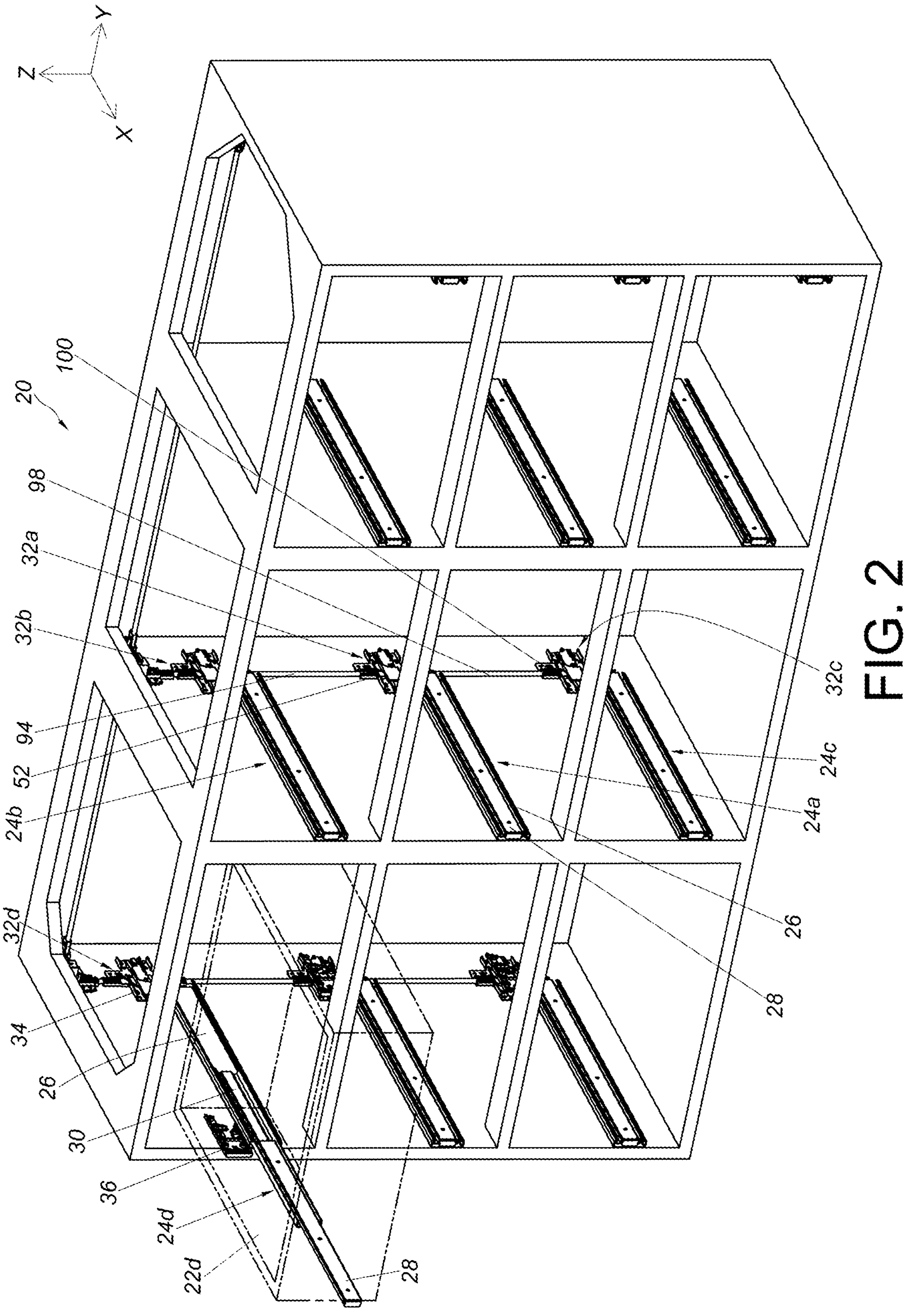
FIG. 2 is a partial diagram of the furniture assembly according to the embodiment of the present invention.

As shown in FIG. 2, the furniture assembly further includes a plurality of slide rail assemblies, e.g., a first slide rail assembly 24*a*, a second slide rail assembly 24*b*, a third slide rail assembly 24*c* and a fourth slide rail assembly 24*d*, for supporting the plurality of drawers, respectively. The first slide rail assembly 24*a*, the second slide rail assembly 24*b*, the third slide rail assembly 24*c* and the fourth slide rail assembly 24*d* can have substantially identical structures. Each of the first slide rail assembly 24*a*, the second slide rail assembly 24*b*, the third slide rail assembly 24*c* and the fourth slide rail assembly 24*d* includes at least two slide rails, e.g., a first rail 26 and a second rail 28 displaceable relative to the first rail 26 along the longitudinal direction. In this embodiment, the longitudinal direction can be defined by a length direction or a displacing direction of the slide rail and parallel to an X axis. The transverse direction can be defined by a lateral direction or a width direction of the slide rail and parallel to a Y axis. The vertical direction can be defined by a height direction of the slide rail and parallel to a Z axis.

Preferably, each of the first slide rail assembly 24*a*, the second slide rail assembly 24*b*, the third slide rail assembly 24*c* and the fourth slide rail assembly 24*d* further includes a third rail 30 movably mounted between the first rail 26 and the second rail 28 for extending a displacement of the second rail 28 relative to the first rail 26.

Preferably, as shown in FIG. 2, the first rails 26 of the first slide rail assembly 24*a*, the second slide rail assembly 24*b*, the third slide rail assembly 24*c* and the fourth slide rail assembly 24*d* are mounted, e.g., fixed, on the cabinet body 20. The second rails 28 of the first slide rail assembly 24*a*, the second slide rail assembly 24*b*, the third slide rail assembly 24*c* and the fourth slide rail assembly 24*d* are configured to support the first drawer 22*a*, the second drawer 22*b*, the third drawer 22*c* and the fourth drawer 22*d*, respectively. The first slide rail assembly 24*a*, the second slide rail assembly 24*b*, the third slide rail assembly 24*c* and the fourth slide rail assembly 24*d* facilitate the first drawer 22*a*, the second drawer 22*b*, the third drawer 22*c* and the fourth drawer 22*d* to be opened or retracted relative to the cabinet body 20 smoothly. For example, when the second rail 28 of the first slide rail assembly 24*a* is retracted relative to the first rail 26 of the first slide rail assembly 24*a*, the first drawer 22*a* is retracted relative to the cabinet body 20. Alternatively, when the second rail 28 of the fourth slide rail assembly 24*d* is retracted relative to the first rail 26 of the fourth slide rail assembly 24*d*, the fourth drawer 22*d* is retracted relative to the cabinet body 20.

The furniture assembly further includes at least one interlock kits, e.g., a first interlock kit 32*a*, a second interlock kit 32*b*, a third interlock kit 32*c* and a fourth interlock kit 32*d*. The first interlock kit 32*a*, the second interlock kit 32*b*, the third interlock kit 32*c* and the fourth interlock kit 32*d* are movably linked together and have similar structures. The first interlock kit 32*a*, the second interlock kit 32*b*, the third interlock kit 32*c* and the fourth interlock kit 32*d* make the furniture assembly have an interlock function, e.g., preventing the second drawer 22*b* and the third drawer 22*c* from being opened relative to the cabinet body 20 when the first drawer 22*a* is opened relative to the cabinet body 20.

Furthermore, each of the first interlock kit 32*a*, the second interlock kit 32*b*, the third interlock kit 32*c* and the fourth interlock kit 32*d* includes a first fitting member 34 and a second fitting member 36. The first fitting member 34 is arranged on the cabinet body 20. The second fitting member 36 is arranged on a corresponding one of the first drawer 22*a*, the second drawer 22*b*, the third drawer 22*c* and the fourth drawer 22*d*. In this embodiment, by way of example, the first fitting member 34 can be detachably mounted on the cabinet body 20, and the second fitting member 36 is detachably mounted on the corresponding drawer. However, the present invention is not limited to this embodiment.

Figure 3:
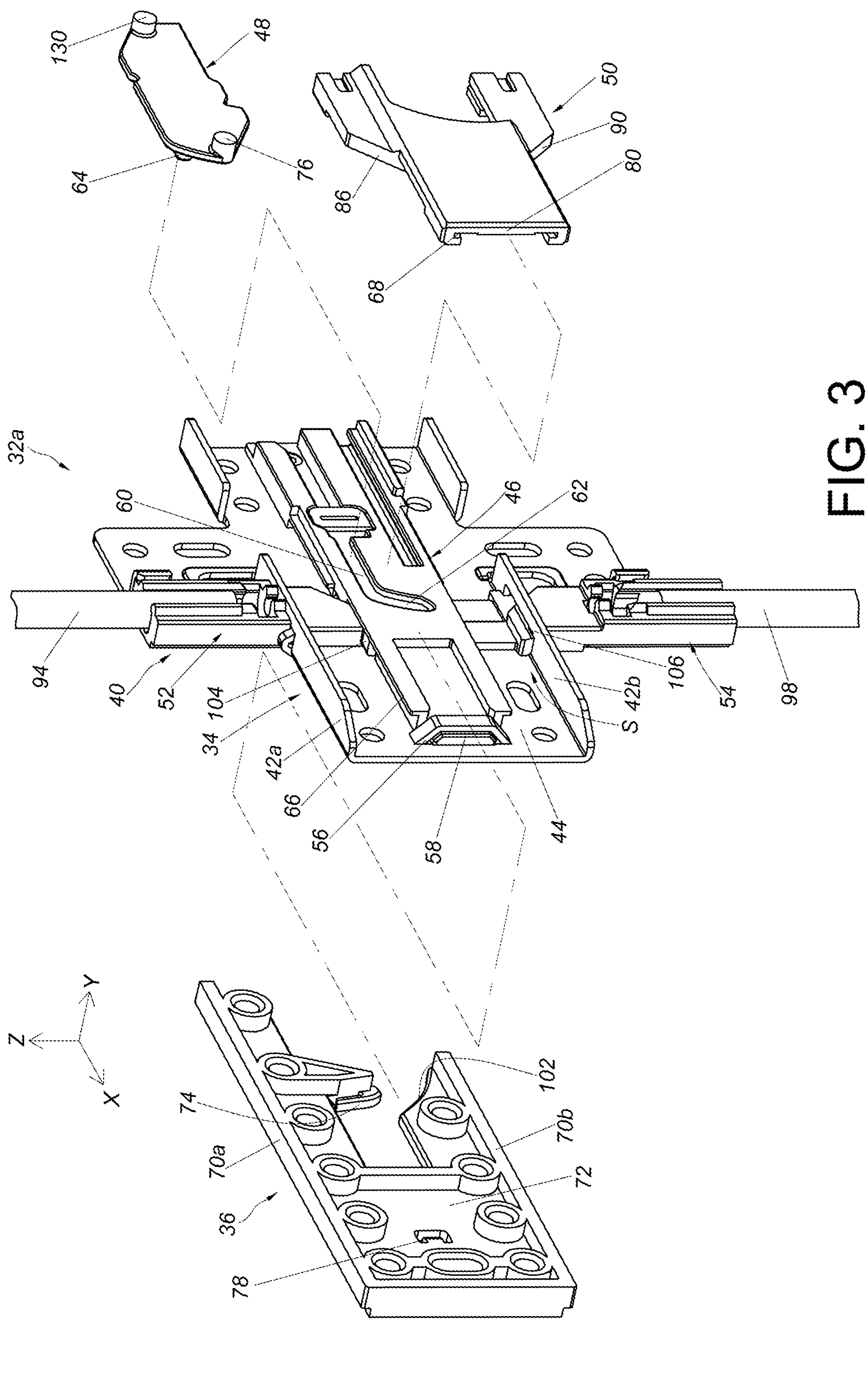
FIG. 3 is an exploded diagram of a first interlock kit according to the embodiment of the present invention.
Figure 4:
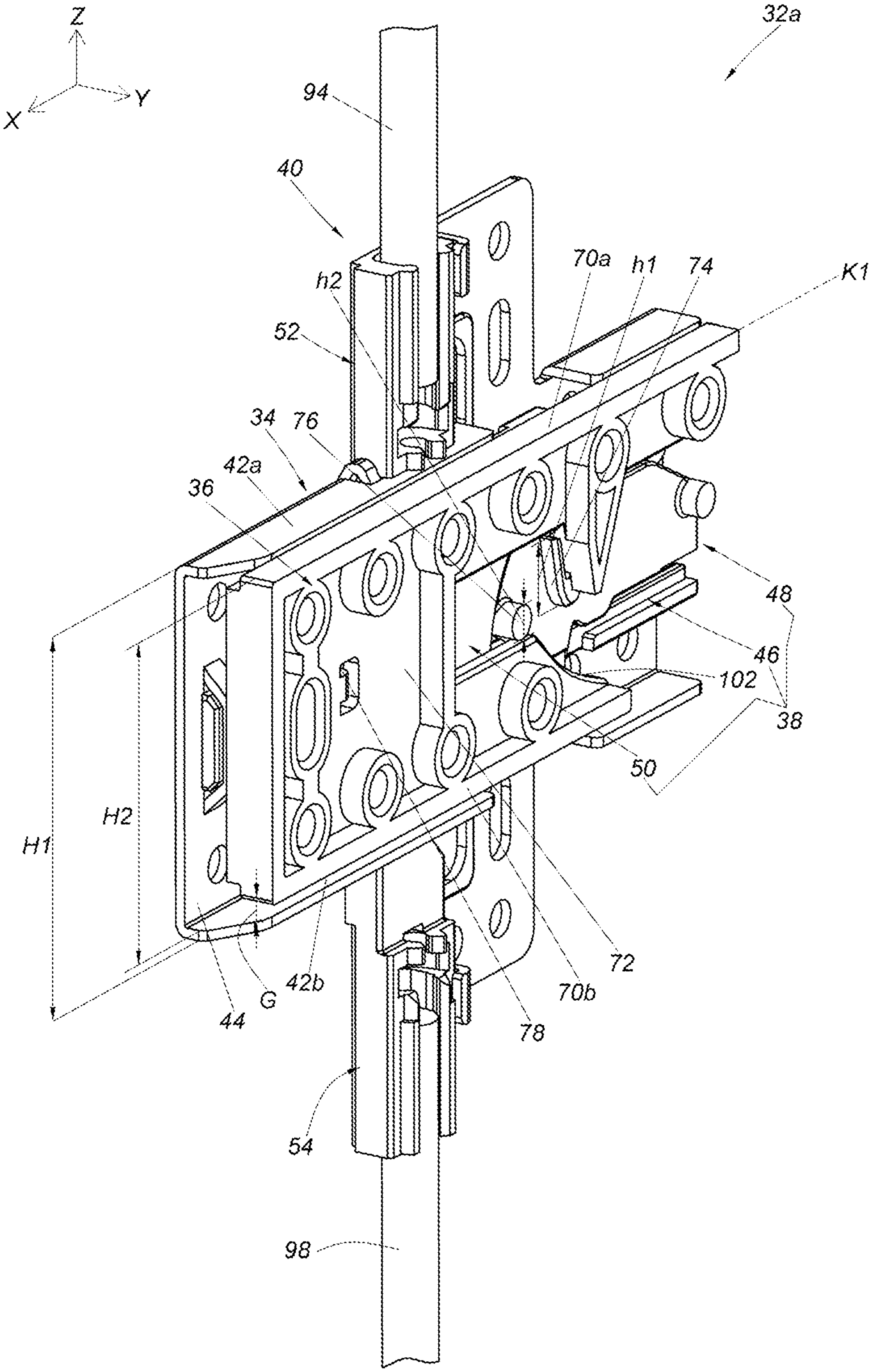
FIG. 4 and FIG. 5 are diagrams of the first interlock kit as a second fitting member is located at a first mounting position at different views according to the embodiment of the present invention.

As shown in FIG. 3 and FIG. 4, the first interlock kit 32*a* further includes an auxiliary device 38 and an interlock mechanism 40.

As shown in FIG. 4, the first fitting member 34 has a first predetermined dimension. In this embodiment, by way of example, the first predetermined dimension is a first predetermined height H1. Furthermore, the first fitting member 34 includes a first wall 42*a*, a second wall 42*b* and a middle wall 44 connected between the first wall 42*a* and the second wall 42*b* of the first fitting member 34. As shown in FIG. 3, the first wall 42*a*, the second wall 42*b* and the middle wall 44 of the first fitting member 34 cooperatively define a space S. As shown in FIG. 4, the first predetermined height H1 is defined by a distance between the first wall 42*a* and the second wall 42*b* of the first fitting member 34 along the height direction.

As shown in FIG. 4, the second fitting member 36 has a second predetermined dimension. In this embodiment, by way of example, the second predetermined dimension is a second predetermined height H2. Furthermore, the second fitting member 36 includes a first wall 70*a*, a second wall 70*b* and a middle wall 72 connected between the first wall 70*a* and the second wall 70*b* of the second fitting member 36, and the second predetermined height H2 is defined by a distance between the first wall 70*a* and the second wall 70*b* of the second fitting member 36 along the height direction, wherein the first predetermined height H1 is different from the second predetermined height H2, and a predetermined gap G is defined by a difference between the first predetermined height H1 and the second predetermined height H2. In this embodiment, by way of example, the second predetermined height H2 is less than the first predetermined height H1, so as to form the predetermined gap G. However, the present invention is not limited to this embodiment.

The auxiliary device 38 is arranged on the first fitting member 34. The auxiliary device 38 includes a base 46, a working member 48 and an auxiliary member 50. The base 46 is connected to the first fitting member 34 and located inside the space S of the first fitting member 34. The working member 48 and the auxiliary member 50 are movable relative to the base 46 and arranged inside the space S of the first fitting member 34.

The interlock mechanism 40 is arranged on the first fitting member 34. The interlock mechanism 40 includes at least one locking member, e.g., a first locking member 52 and a second locking member 54. The first locking member 52 and the second locking member 54 are movably mounted on the first fitting member 34 and located adjacent to the first wall 42*a* and the second wall 42*b* of the first fitting member 34, respectively.

Preferably, as shown in FIG. 3, the base 46 is connected to the middle wall 44 of the first fitting member 34 and located inside the space S. In this embodiment, by way of example, one of the first fitting member 34 and the base 46 can include a first mounting feature 56, and the other one of the first fitting member 34 and the base 46 can include a second mounting feature 58 configured to be detachably mounted on the first mounting feature 56, e.g., in an inserting manner or in an engaging manner. However, the present invention is not limited to this embodiment.

Preferably, the working member 48 is movably mounted on the base 46. Furthermore, the base 46 includes a longitudinal part 60 and a bending part 62. The longitudinal part 60 has a predetermined longitudinal length. The bending part 62 extends and bends from the longitudinal part 60. Besides, as shown in FIG. 3, the working member 48 includes a supporting feature 64, such that the working member 48 is movable along the longitudinal part 60 and the bending part 62 of the base 46 by the supporting feature 64.

Preferably, the auxiliary member 50 is mounted on the base 46 and movable relative to the base 46 along the longitudinal direction. In this embodiment, by way of example, one of the base 46 and the auxiliary member 50 can include at least one first cooperating feature 66, and the other one of the base 46 and the auxiliary member 50 can include at least one second cooperating feature 68 configured to cooperate with the at least one first cooperating feature 66. One of the at least one first cooperating feature 66 and the at least one second cooperating feature 68 can be a longitudinal rib, and the other one of the at least one first cooperating feature 66 and the at least one second cooperating feature 68 can be a groove. However, the present invention is not limited to this embodiment.

Preferably, the second fitting member 36 includes an actuating part 74. The working member 48 includes a working part 76. The working part 76 of the working member 48 is configured to cooperate with the actuating part 74 of the second fitting member 36. In this embodiment, by way of example, the working part 76 can be a protrusion. However, the present invention is not limited to this embodiment.

Preferably, as shown in FIG. 4, an extending length h1 of the actuating part 74 of the second fitting member 36 along the height direction is different from an extending length h2 of the working part 76 of the working member 48 along the height direction. In this embodiment, by way of example, the extending length h1 of the actuating part 74 of the second fitting member 36 along the height direction is greater than the extending length h2 of the working part 76 of the working member 48 along the height direction. However, the present invention is not limited to this embodiment.

Figure 5:
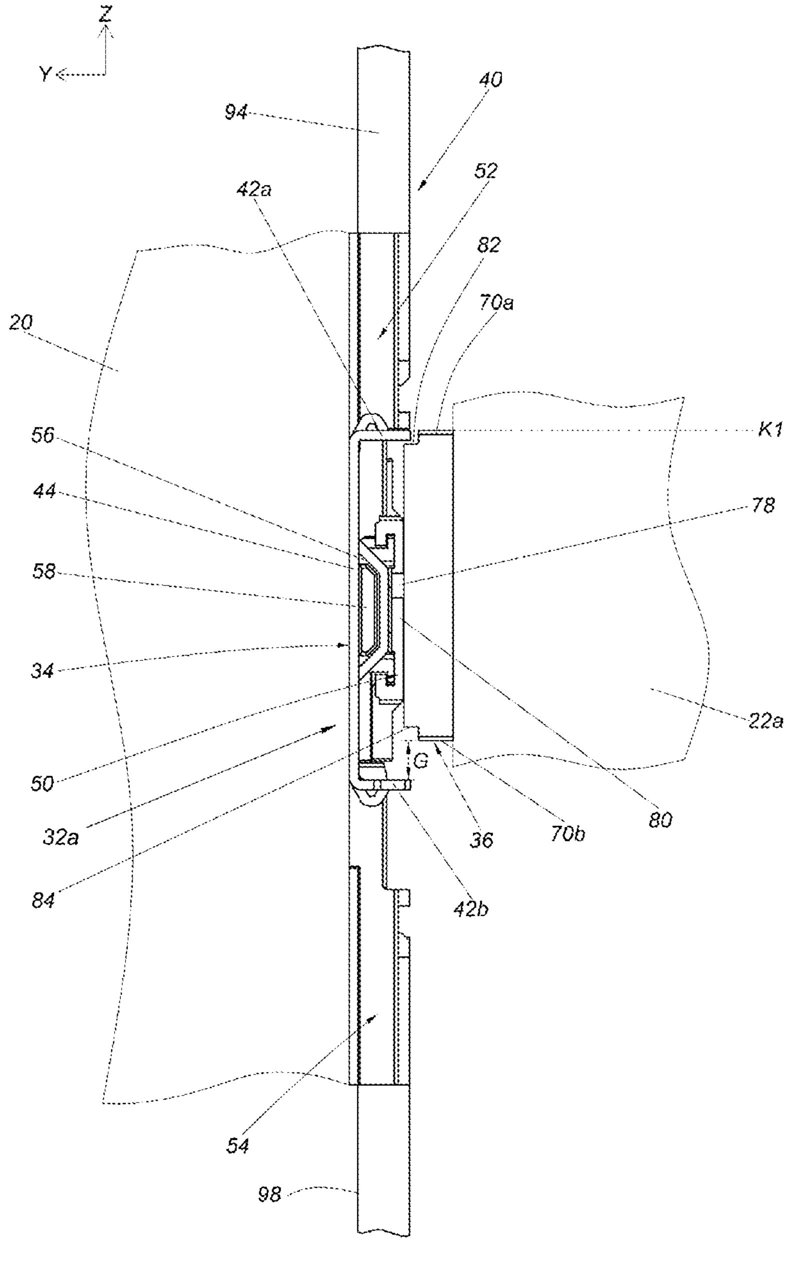
Figure 6:
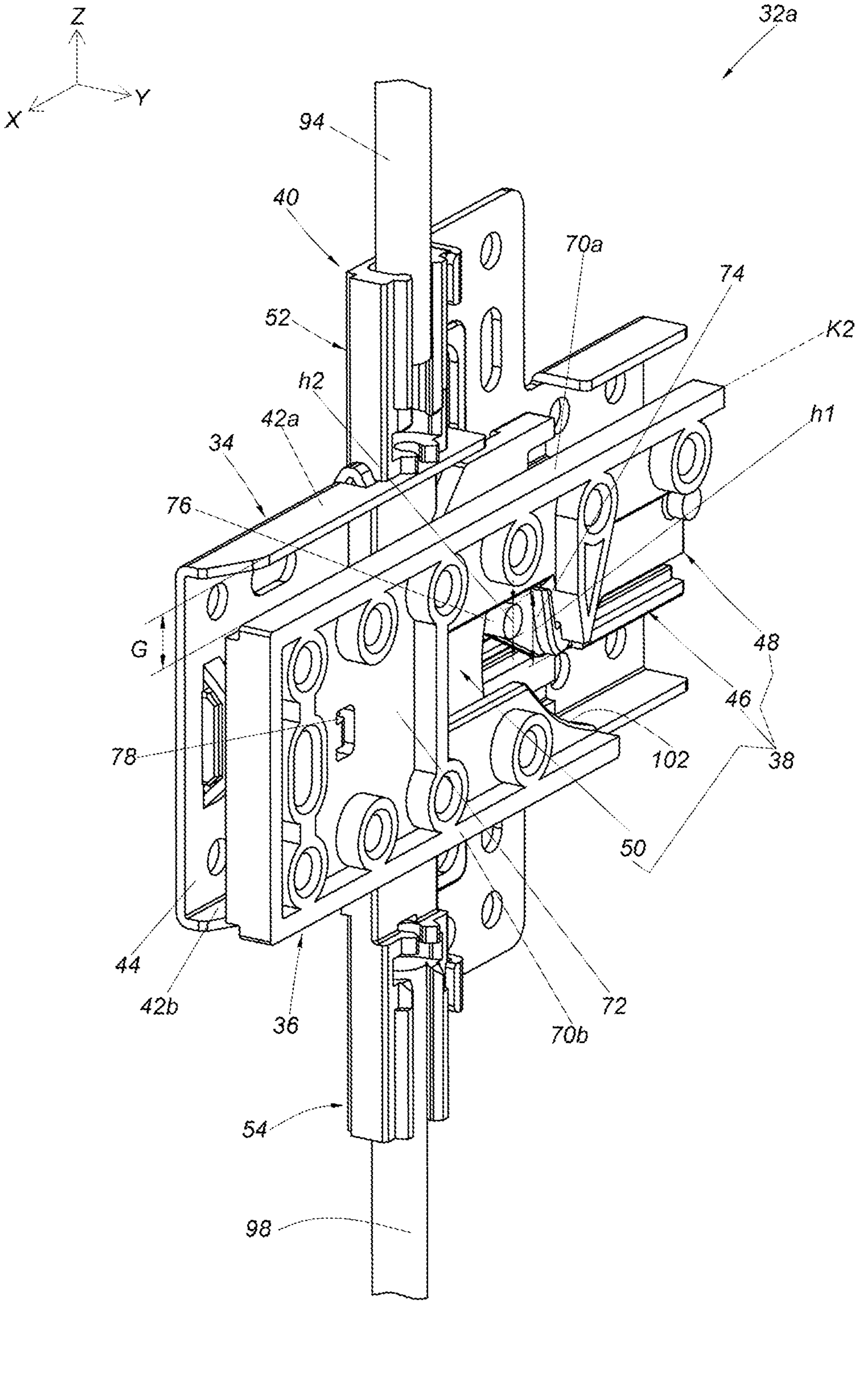
FIG. 6 and FIG. 7 are diagrams of the first interlock kit as the second fitting member is located at a second mounting position at different views according to the embodiment of the present invention.
Figure 7:
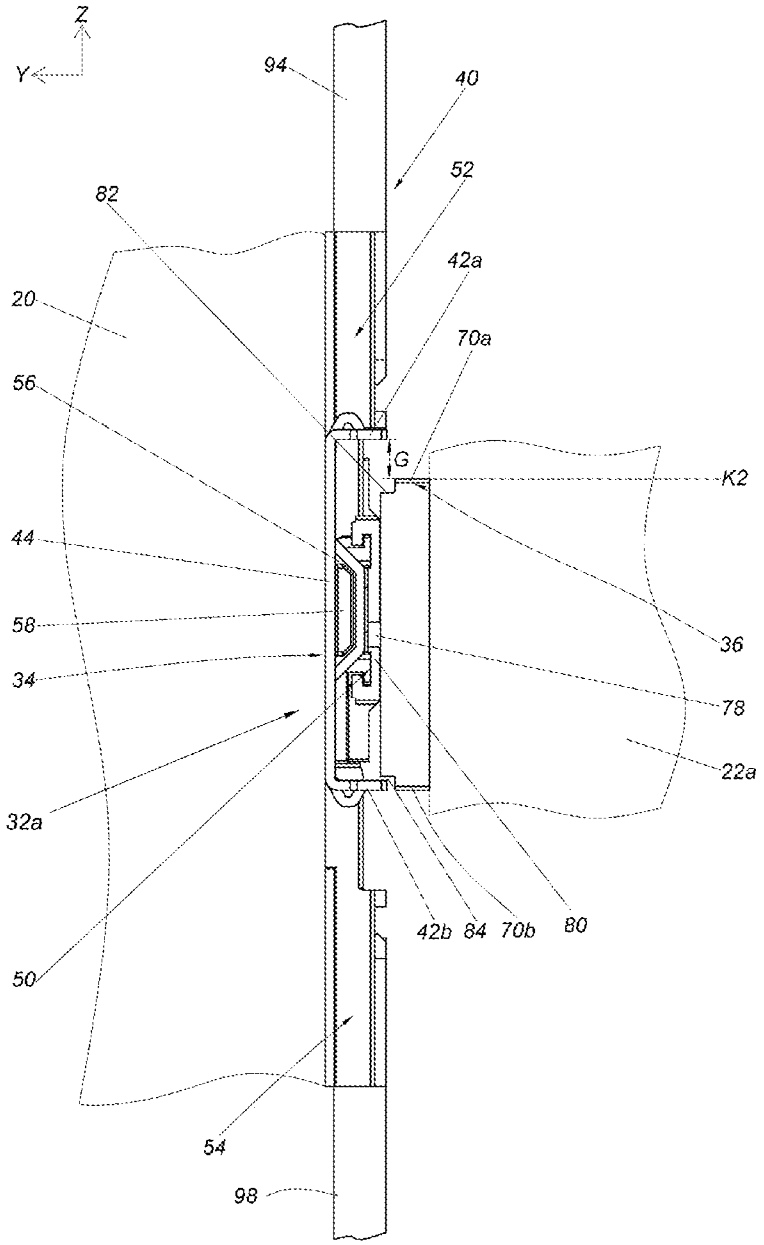

The second fitting member 36 can be mounted on the first drawer 22*a* at any mounting position within a mounting range defined by the predetermined gap G and a position of the first fitting member 34. As shown in FIG. 4 and FIG. 5, the second fitting member 36 can be mounted on the first drawer 22*a* at a first mounting position K1 where the first wall 70*a* of the second fitting member 36 and the first wall 42*a* of the first fitting member 34 are located adjacent to and substantially aligned with each other, and the second wall 70*b* of the second fitting member 36 and the second wall 42*b* of the first fitting member 34 are separated away from each other at a distance approximately equal to the predetermined gap G. As shown in FIG. 6 and FIG. 7, the second fitting member 36 can be mounted on the first drawer 22*a* at a second mounting position K2 where the first wall 70*a* of the second fitting member 36 and the first wall 42*a* of the first fitting member 34 are separated away from each other at a distance approximately equal to the predetermined gap G, and the second wall 70*b* of the second fitting member 36 and the second wall 42*b* of the first fitting member 34 are located adjacent to and substantially aligned with each other.

Preferably, the first fitting member 34 and the second fitting member 36 are configured to be restrained by each other. As shown in FIG. 5, in this embodiment, by way of example, one of the first wall 70*a* of the second fitting member 36 and the first wall 42*a* of the first fitting member 34 can include a first restraining feature 82 configured to block the other one of the first wall 70*a* of the second fitting member 36 and the first wall 42*a* of the first fitting member 34, so as to position the second fitting member 36 at the first mounting position K1, e.g., a highest position within the mounting range. As shown in FIG. 7, in this embodiment, by way of example, one of the second wall 70*b* of the second fitting member 36 and the second wall 42*b* of the first fitting member 34 can include a second restraining feature 84 configured to block the other one of the second wall 70*b* of the second fitting member 36 and the second wall 42*b* of the first fitting member 34, so as to position the second fitting member 36 at the second mounting position K2, e.g., a lowest position within the mounting range.

Preferably, as shown in FIG. 3, the second fitting member 36 further includes a first predetermined portion 78, and the auxiliary member 50 further includes a second predetermined portion 80 configured to cooperate with the first predetermined portion 78. In this embodiment, by way of example, the second predetermined portion 80 can be a front end of the auxiliary member 50. However, the present invention is not limited to this embodiment.

From the above, understandably, even if there is any assembly error on the first fitting member 34 and/or the second fitting member 36, due to the predetermined gap G, the present invention ensures the second fitting member 36 to be moved inside the space S of the first fitting member 34 to ensure normal operation of the interlock mechanism 40 during an opening movement or a retracting movement of the first drawer 22*a*.

As for the second interlock kit 32*b*, the third interlock kit 32*c* and the fourth interlock kit 32*d*, understandably, the first fitting member 34 and the second fitting member 36 of each of the second interlock kit 32*b*, the third interlock kit 32*c* and the fourth interlock kit 32*d* are substantially identical to the first fitting member 34 and the second fitting member 36 of the first interlock kit 32*a*, so as to ensure normal operation of a corresponding interlock mechanism during an opening movement or a retracting movement of the corresponding drawer.

Figure 8:
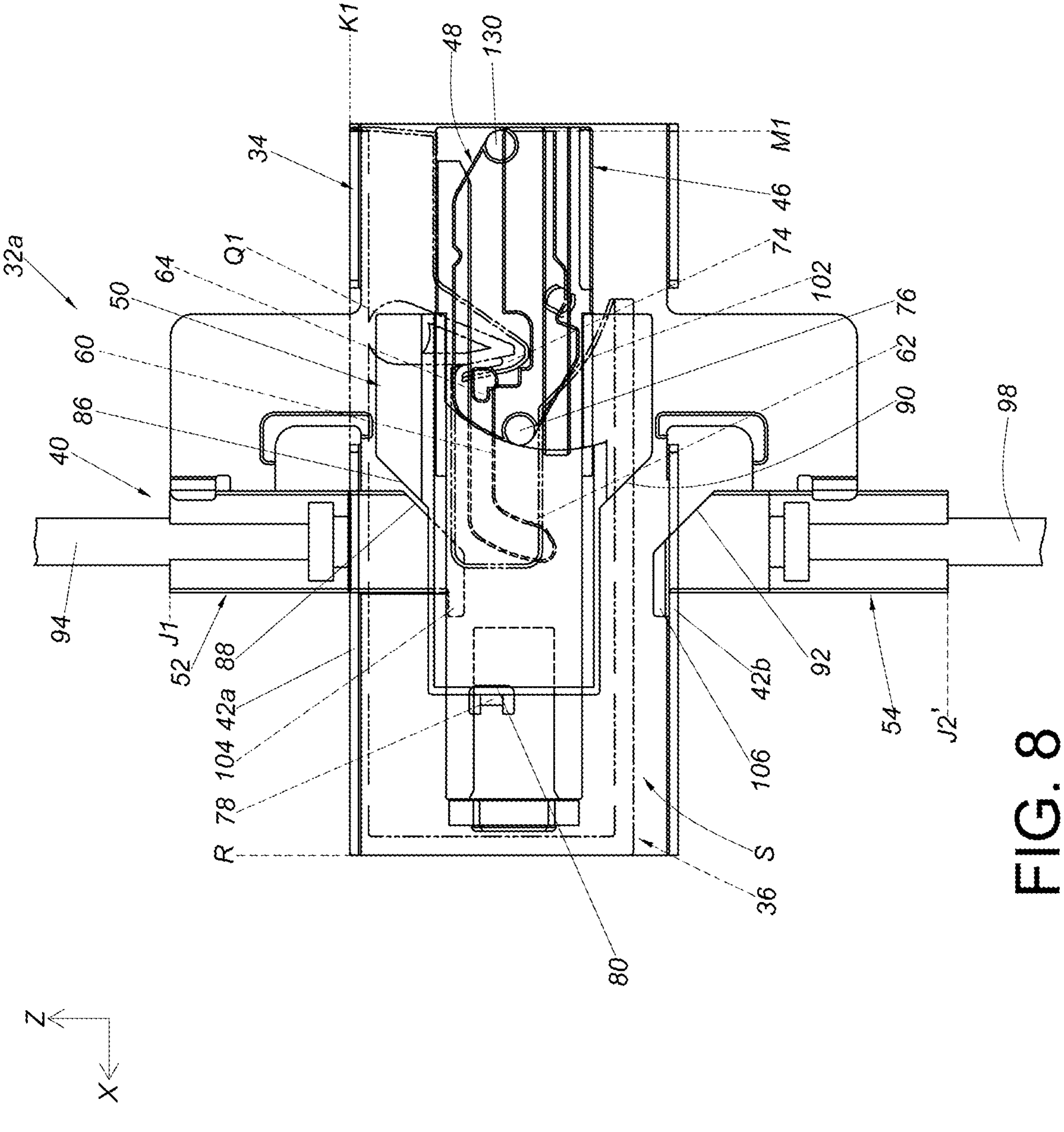
FIG. 8 is a diagram of the first interlock kit as the second fitting member is located at the first mounting position and the first drawer is displaced to a retracted position according to the embodiment of the present invention.

As for the first interlock kit 32*a*, as shown in FIG. 8, one of the auxiliary member 50 and the first locking member 52 includes a first guiding portion 86. In this embodiment, by way of example, the auxiliary member 50 includes the first guiding portion 86. Preferably, the first locking member 52 includes a first auxiliary guiding feature 88 configured to cooperate with the first guiding portion 86. As shown in FIG. 8, in this embodiment, by way of example, the first guiding portion 86 and the first auxiliary guiding feature 88 can be inclined surfaces or arc surfaces. However, the present invention is not limited to this embodiment. Similarly, one of the auxiliary member 50 and the second locking member 54 includes a second guiding portion 90. In this embodiment, by way of example, the auxiliary member 50 includes the second guiding portion 90. Preferably, the second locking member 54 includes a second auxiliary guiding feature 92 configured to cooperate with the second guiding portion 90. As shown in FIG. 8, in this embodiment, by way of example, the second guiding portion 90 and the second auxiliary guiding feature 92 can be inclined surfaces or arc surfaces. However, the present invention is not limited to this embodiment.

Preferably, in this embodiment, by way of example, the first predetermined portion 78 of the second fitting member 36 can be a resilient arm. However, the present invention is not limited to this embodiment.

Figure 11:
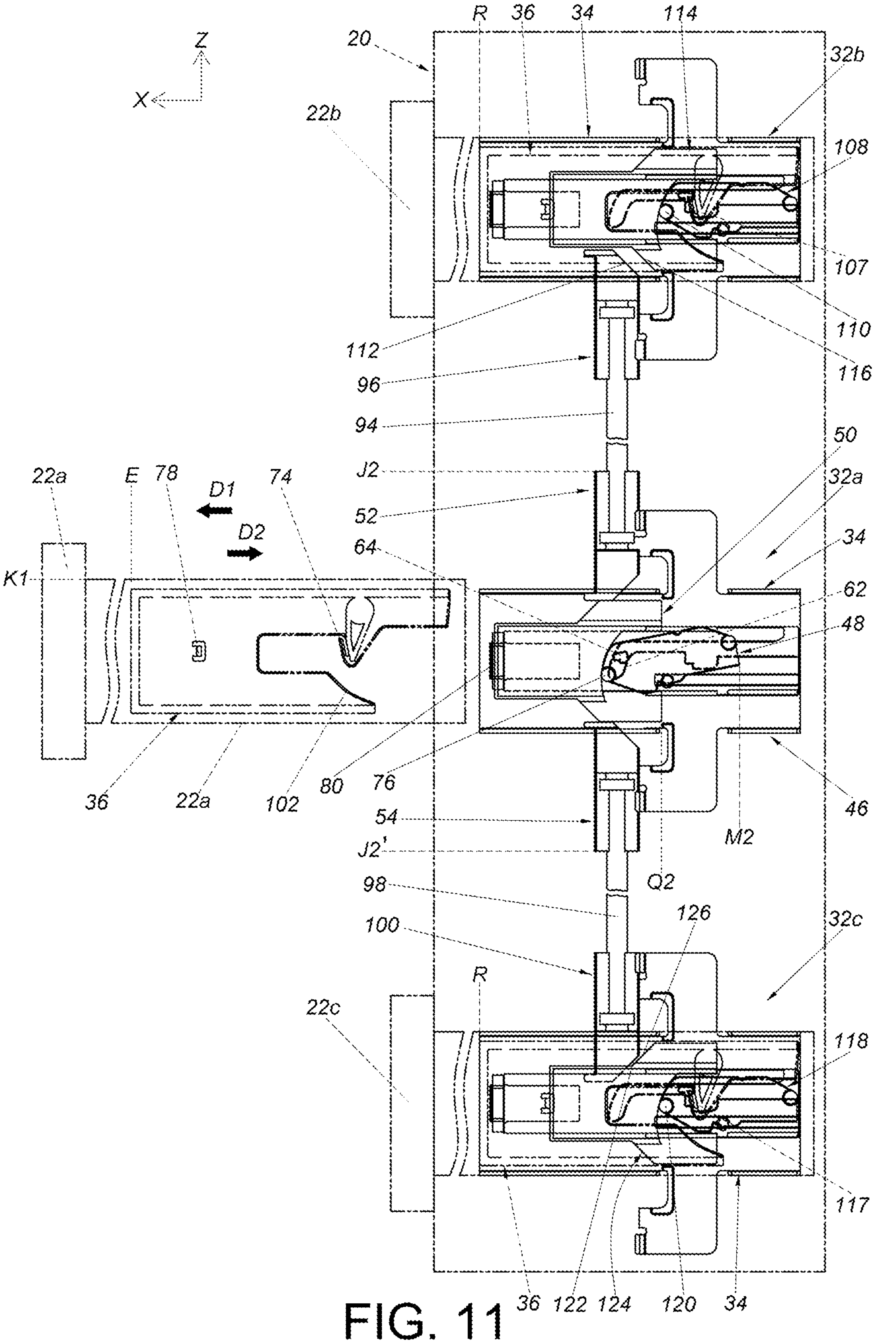
FIG. 11 is a diagram illustrating the first interlock kit locks a second interlock kit and a third interlock kit and the second fitting member is located at the first mounting position according to the embodiment of the present invention.

Preferably, as shown in FIG. 11, the first locking member 52 of the first interlock kit 32*a* is connected to a first rod 94 connected to a second locking member 96 of the second interlock kit 32*b*, and the second locking member 54 of the first interlock kit 32*a* is connected to a second rod 98 connected to a first locking member 100 of the third interlock kit 32*c*.

Preferably, the actuating part 74 is integrally connected to the second fitting member 36, and the second fitting member 36 further includes a guiding section 102 adjacent to the actuating part 74. In this embodiment, by way of example, the guiding section 102 can be an arc surface or an inclined surface. However, the present invention is not limited to this embodiment.

Figure 12:
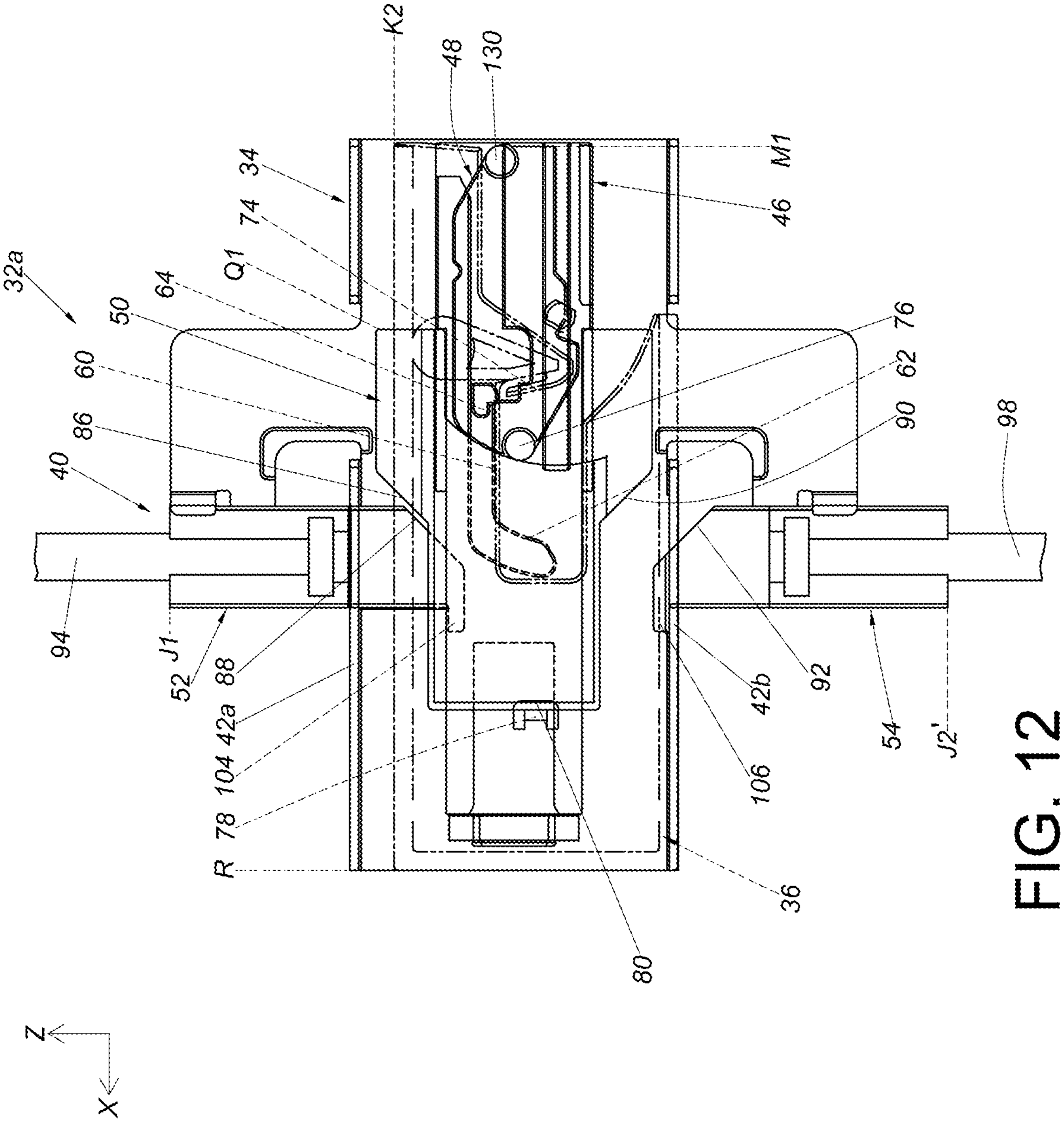
FIG. 12 is a diagram of the first interlock kit as the second fitting member is located at the second mounting position and the first drawer is displaced to the retracted position according to the embodiment of the present invention.

When the first interlock kit 32*a* is in a state as shown in FIG. 8 or in a state as shown in FIG. 12, the working member 48 is located at a first working position M1 relative to the base 46, and the supporting feature 64 of the working member 48 is located at a position corresponding to the longitudinal part 60. Besides, when the first interlock kit 32*a* is in the state as shown in FIG. 8 or in the state as shown in FIG. 12, the auxiliary member 50 is located at a first auxiliary position Q1 relative to the base 46. In addition, as shown in FIG. 8 and FIG. 12, at this moment, the first locking member 52 is located at an unlocking position J1 where the first auxiliary guiding feature 88 of the first locking member 52 is located at a position corresponding to the first guiding portion 86 of the auxiliary member 50, and the second locking member 54 is located at a locking position J2' where the second auxiliary guiding feature 92 of the second locking member 54 is located at a position not corresponding to the second guiding portion 90 of the auxiliary member 50, e.g., the second auxiliary guiding feature 92 of the second locking member 54 is misaligned with the second guiding portion 90 of the auxiliary member 50.

Preferably, a portion of the first locking member 52 is located inside the space S of the first fitting member 34, and the first locking member 52 includes a first restraining section 104 configured to abut against an inner side of the first wall 42*a* of the first fitting member 34 for preventing an excessive movement of the first locking member 52. Similarly, a portion of the second locking member 54 is located inside the space S of the first fitting member 34, and the second locking member 54 includes a second restraining section 106 configured to abut against an inner side of the second wall 42*b* of the first fitting member 34 for preventing an excessive movement of the second locking member 54.

Preferably, the base 46 is configured to support the first locking member 52 for retaining the first locking member 52 at the unlocking position J1. Besides, the second restraining section 106 of the second locking member 54 and the inner side of the second wall 42*b* of the first fitting member 34 are configured to abut against each other for retaining the second locking member 54 at the locking position J2'.

Figure 9:
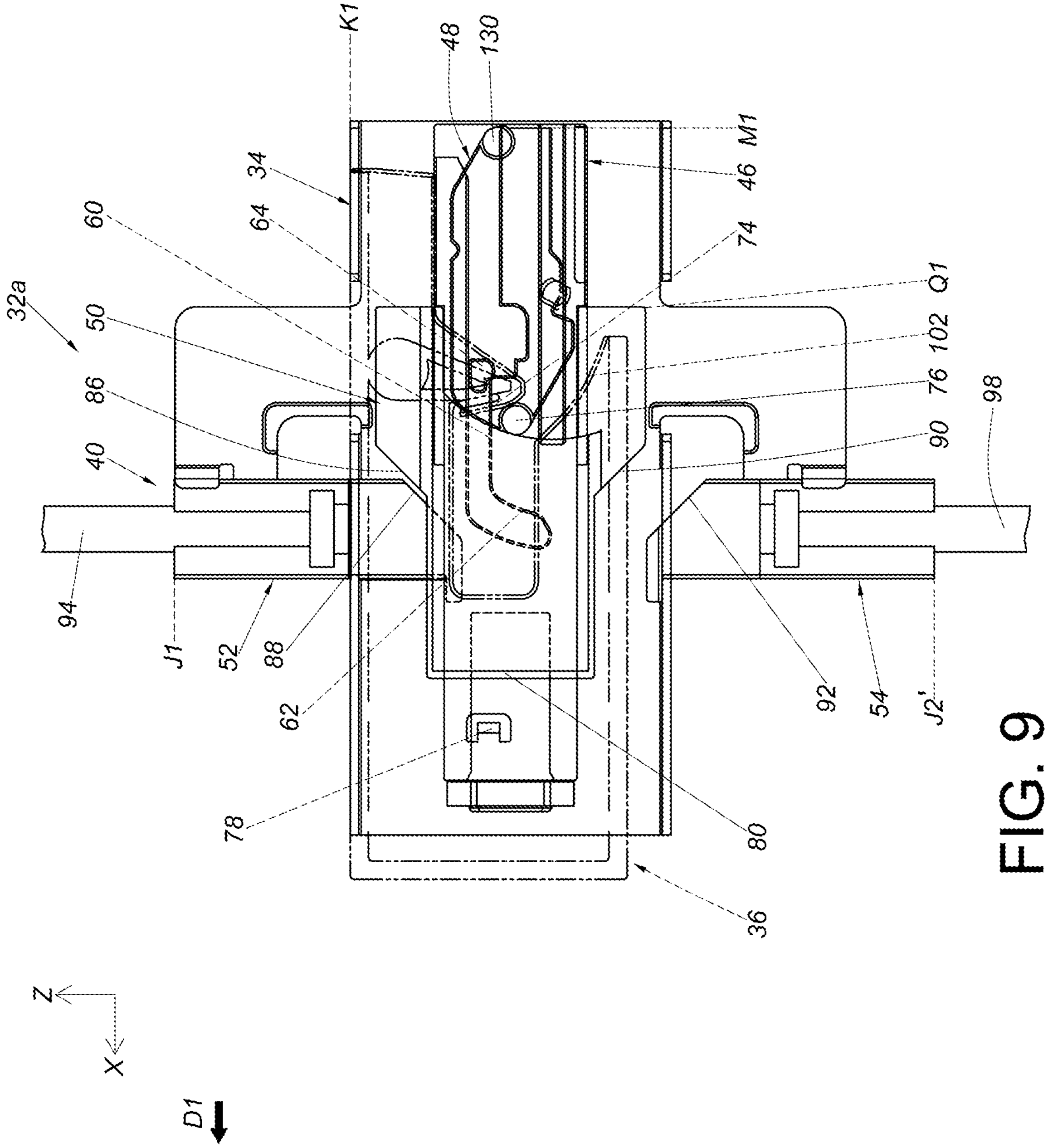
FIG. 9 is a diagram of the first interlock kit as the second fitting member is located at the first mounting position and the first drawer is displaced from the retracted position along a first predetermined direction according to the embodiment of the present invention.
Figure 10:
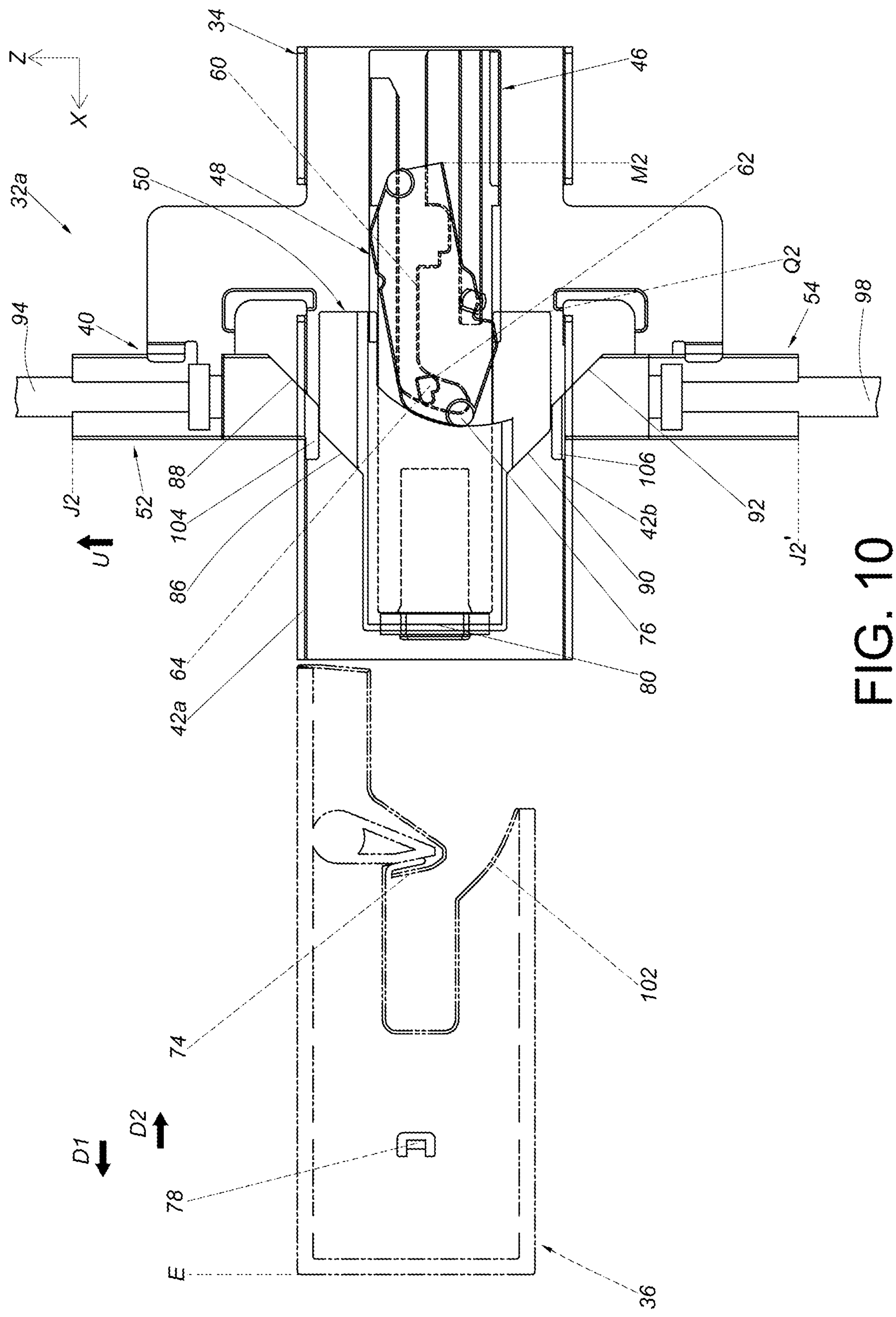
FIG. 10 is a diagram of the first interlock kit as the second fitting member is located at the first mounting position and the first drawer is displaced to an extended position along the first predetermined direction according to the embodiment of the present invention.

As shown in FIG. 8, FIG. 9 and FIG. 10, when the second fitting member 36 is mounted on the first drawer 22*a* at the first mounting position K1 within the mounting range, the actuating part 74 of the second fitting member 36 is located at a position corresponding to the working part 76 of the working member 48. As shown in FIG. 8 and FIG. 9, due to a configuration of the predetermined gap G and/or a configuration of a difference between the extending length h1 of the actuating part 74 of the second fitting member 36 along the height direction and the extending length h2 of the working part 76 of the working member 48 along the height direction, the actuating part 74 of the second fitting member 36 is still located at a position corresponding to the working part 76 of the working member 48 even if the second fitting member 36 is mounted at another position within the mounting range different from the first mounting position K1.

FIG. 8 to FIG. 10 and FIG. 12 to FIG. 14 illustrate the first fitting member 34 and the second fitting member 36 as representative of the first drawer 22*a* and the cabinet body 20.

Furthermore, as shown in FIG. 8 to FIG. 10, when the second fitting member 36 is mounted on the first drawer 22*a* at the first mounting position K1 and the first drawer 22*a* is displaced from a retracted position R as shown in FIG. 8 toward an extended position E as shown in FIG. 10 along a first predetermined direction D1, e.g., an opening direction, the actuating part 74 of the second fitting member 36 driven by the first drawer 22*a* abuts against the working part 76 of the working member 48 for driving the working member 48 to move from the first working position M1 as shown in FIG. 8 and FIG. 9 to a second working position M2 as shown in FIG. 10, such that the working member 48 is tilted to engage the supporting feature 64 of the working member 48 with the bending part 62 of the base 46, and the auxiliary member 50 is driven to move from the first auxiliary position Q1 as shown in FIG. 8 and FIG. 9 to a second auxiliary position Q2 as shown in FIG. 10 for retaining the interlock mechanism 40 in a locking state.

During the aforementioned movement of the auxiliary member 50 from the first auxiliary position Q1 to the second auxiliary position Q2, the auxiliary member 50 drives the first locking member 52 to move from the unlocking position J1 as shown in FIG. 8 to a locking position J2 as shown in FIG. 10 along the vertical direction, e.g., a height direction U, by an abutment of the first guiding portion 86 and the first auxiliary guiding feature 88. As shown in FIG. 10, when the auxiliary member 50 is located at the second auxiliary position Q2, the auxiliary member 50 can support the first locking member 52 for retaining the first locking member 52 at the locking position J2. Besides, as shown in FIG. 10, when the auxiliary member 50 is located at the second auxiliary position Q2, the auxiliary member 50 can press the second locking member 54 for retaining the second locking member 54 at the locking position J2'. In addition, as shown in FIG. 10, during the aforementioned movement of the working member 48 from the first working position M1 to the second working position M2, the working member 48 is tilted, such that the working part 76 of the working member 48 disengages from the actuating part 74 of the second fitting member 36.

Preferably, during the movement of the working member 48 from the first working position M1 as shown in FIG. 8 to the second working position M2 as shown in FIG. 10, the auxiliary member 50 is driven by the working member 48 to move from the first auxiliary position Q1 as shown in FIG. 8 to the second auxiliary position Q2 as shown in FIG. 10.

As shown in FIG. 11, when the first drawer 22*a* is displaced to the extended position E and the auxiliary member 50 is located at the second auxiliary position Q2, the auxiliary member 50 retains the first locking member 52 and the second locking member 54 at the locking positions J2, J2' respectively for preventing opening movements of the other second fitting members 36, e.g., the second fitting members 36 of the second interlock kit 32*b* and the third interlock kit 32*c*, relative to the corresponding first fitting member 34 along the first predetermined direction D1, so as to prevent the corresponding drawers, e.g., the second drawer 22*b* and the third drawer 22*c*, from being opened relative to the cabinet body 20.

Furthermore, two ends of the first rod 94 are connected to the first locking member 52 of the first interlock kit 32*a* and the second locking member 96 of the second interlock kit 32*b*, respectively. When the second drawer 22*b* is located at the retracted position R, an actuating part 107 of the second fitting member 36 of the second interlock kit 32*b* engages with a working member 108, e.g., a working part 110 of the working member 108, of the second interlock kit 32*b*. As shown in FIG. 10, when the first locking member 52 of the first interlock kit 32*a* is retained at the locking position J2, the second locking member 96, e.g., a second auxiliary guiding feature 112 of the second locking member 96, of the second interlock kit 32*b*, can block an auxiliary member 114, e.g., a second guiding portion 116 of the auxiliary member 114, of the second interlock kit 32*b* to prevent the auxiliary member 114 of the second interlock kit 32*b* from moving along the first predetermined direction D1, so as to prevent the second fitting member 36 of the second interlock kit 32*b* from moving relative to the first fitting member 34 of the second interlock kit 32*b* along the first predetermined direction D1 for preventing the second drawer 22*b* from being opened from the retracted position R along the first predetermined direction D1.

Similarly, two ends of the second rod 98 are connected to the second locking member 54 of the first interlock kit 32*a* and the first locking member 100 of the third interlock kit 32*c*, respectively. When the third drawer 22*c* is located at the retracted position R, an actuating part 117 of the second fitting member 36 of the third interlock kit 32*c* engages with a working member 118, e.g., a working part 120 of the working member 118, of the third interlock kit 32*c*. As shown in FIG. 10, when the second locking member 54 of the first interlock kit 32*a* is retained at the locking position J2', the first locking member 100, e.g., a first auxiliary guiding feature 122 of the first locking member 100, of the third interlock kit 32*c* can block an auxiliary member 124, e.g., a first guiding portion 126 of the auxiliary member 124, of the third interlock kit 32*c* to prevent the auxiliary member 124 of the third interlock kit 32*c* from moving along the first predetermined direction D1, so as to prevent the second fitting member 36 of the third interlock kit 32*c* from moving relative to the first fitting member 34 of the second interlock kit 32*b* along the first predetermined direction D1 for preventing the third drawer 22*c* from being opened from the retracted position R along the first predetermined direction D1.

From the above, understandably, when the first drawer 22*a* is opened, the auxiliary member 50 of the first interlock kit 32*a* moves to the second auxiliary position Q2 for retaining the interlock mechanism 40 in the locking state to achieve the interlock function for preventing the second drawer 22*b* and the third drawer 22*c* from being opened.

When it is desired to terminate the interlock function, it has to move the auxiliary member 50 of the first interlock kit 32*a* from the second auxiliary position Q2 as shown in FIG. 11 and FIG. 10 back to the first auxiliary position Q1 as shown in FIG. 8. Furthermore, when the first drawer 22*a* is displaced from the extended position E toward the retracted position R along a second predetermined direction D2, e.g. a retracting direction, the auxiliary member 50 can be driven to move from the second auxiliary position Q2 as shown in FIG. 11 and FIG. 10 to the first auxiliary position Q1 as shown in FIG. 8, e.g., the auxiliary member 50 can be driven to move from the second auxiliary position Q2 as shown in FIG. 11 and FIG. 10 to the first auxiliary position Q1 as shown in FIG. 8 by an abutment of the first predetermined portion 78 of the second fitting member 36 and the second predetermined portion 80 of the auxiliary member 50. As shown in FIG. 8, when the auxiliary member 50 is located at the first auxiliary position Q1, the auxiliary member 50 does not support the first locking member 52, such that the first locking member 52 can return back to the unlocking position J1. Besides, as shown in FIG. 8, when the auxiliary member 50 is located at the first auxiliary position Q1, the auxiliary member 50 does not press the second locking member 54 for allowing the second locking member 54 to move from the locking position J2'. In other words, when the auxiliary member 50 is located at the first auxiliary position Q1, the interlock function is terminated. Besides, as shown in FIG. 8, when the first drawer 22*a* is displaced from the extended position E toward the retracted position R along the second predetermined direction D2, e.g. the retracting direction, the working part 76 of the working member 48 can be driven to move along the guiding section 102 of the actuating part 74 to disengage the supporting feature 64 of the working member 48 from the bending part 62 of the base 46 for returning the working member 48 back to the first working position M1.

Figure 13:
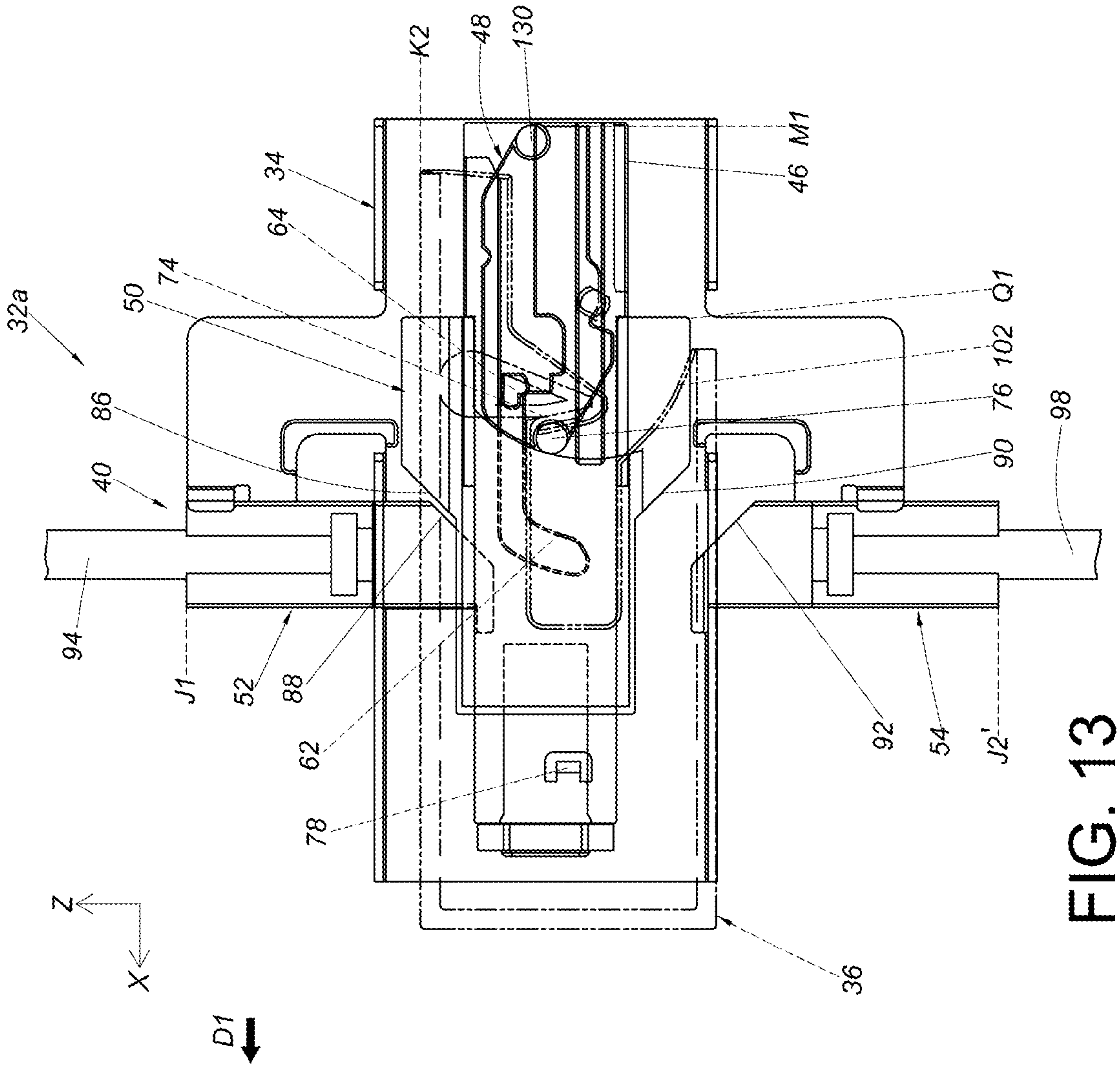
FIG. 13 is a diagram of the first interlock kit as the second fitting member is located at the second mounting position and the first drawer is displaced from the retracted position along the first predetermined direction according to the embodiment of the present invention.
Figure 14:
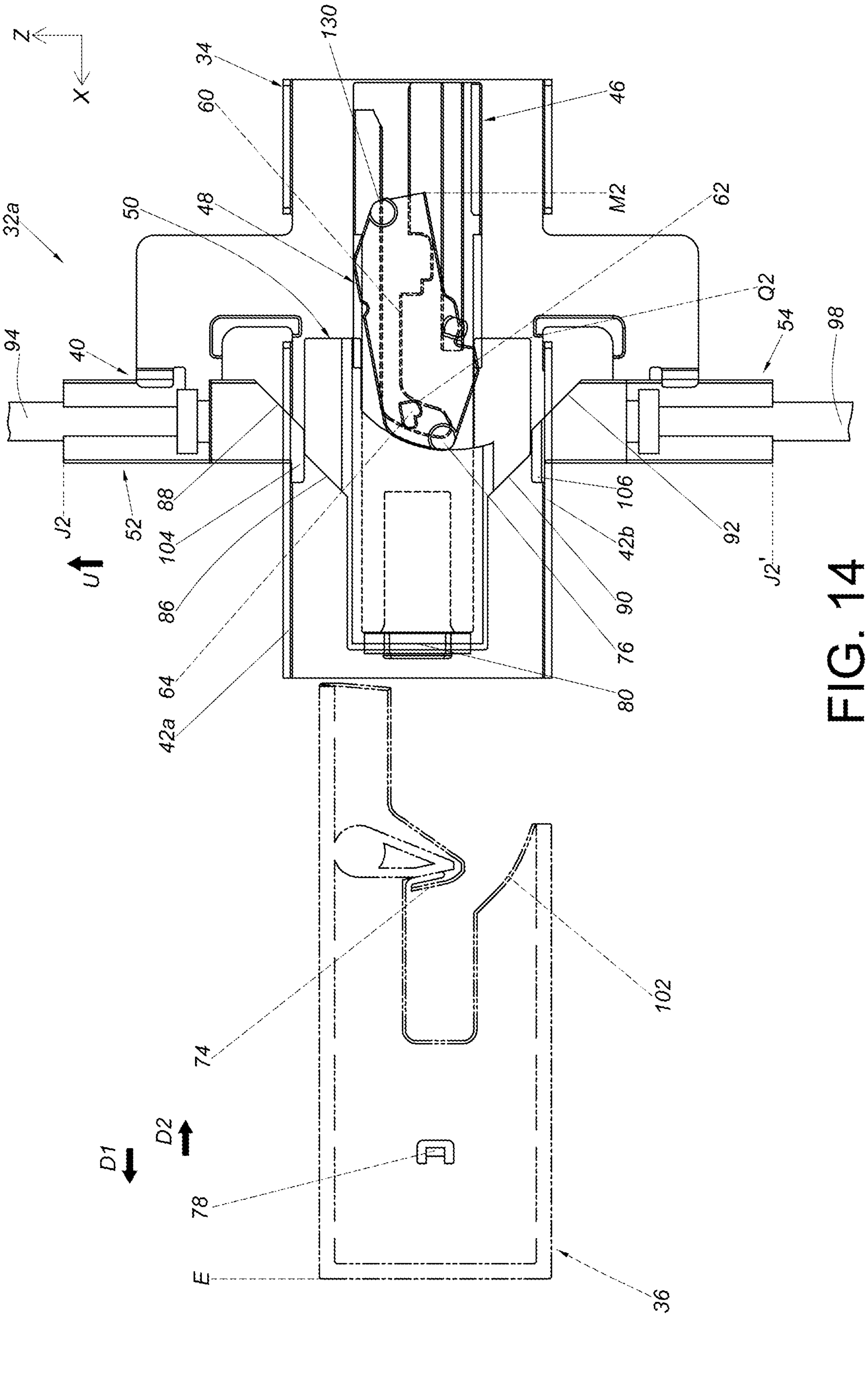
FIG. 14 is a diagram of the first interlock kit as the second fitting member is located at the first mounting position and the first drawer is displaced to the extended position along the first predetermined direction according to the embodiment of the present invention.

As shown in FIG. 12, FIG. 13 and FIG. 14, when the second fitting member 36 is mounted on the first drawer 22*a* at the second mounting position K2 within the mounting range, the actuating part 74 of the second fitting member 36 is located at another position corresponding to the working part 76 of the working member 48. As shown in FIG. 12 and FIG. 13, due to the configuration of the predetermined gap G and/or the configuration of the difference between the extending length h1 of the actuating part 74 of the second fitting member 36 along the height direction and the extending length h2 of the working part 76 of the working member 48 along the height direction, the actuating part 74 of the second fitting member 36 is still located at a position corresponding to the working part 76 of the working member 48 even if the second fitting member 36 is mounted at another position within the mounting range different from the second mounting position K2.

Furthermore, when the second fitting member 36 is mounted on the first drawer 22*a* at the second mounting position K2 and the first drawer 22*a* is displaced from the retracted position R as shown in FIG. 12 toward the extended position E as shown in FIG. 14 along the first predetermined direction D1, e.g., the opening direction, the actuating part 74 of the second fitting member 36 driven by the first drawer 22*a* abuts against the working part 76 of the working member 48 for driving the working member 48 to move from the first working position M1 to the second working position M2 as shown in FIG. 14, such that the working member 48 is tilted to engage the supporting feature 64 of the working member 48 with the bending part 62 of the base 46, and the auxiliary member 50 is driven to move from the first auxiliary position Q1 as shown in FIG. 12 and FIG. 13 to the second auxiliary position Q2 as shown in FIG. 14 for retaining the interlock mechanism 40 in the locking state.

During the aforementioned movement of the auxiliary member 50 from the first auxiliary position Q1 to the second auxiliary position Q2, the auxiliary member 50 drives the first locking member 52 to move from the unlocking position J1 as shown in FIG. 12 to the locking position J2 as shown in FIG. 14 along the vertical direction, e.g., the height direction U, by the abutment of the first guiding portion 86 and the first auxiliary guiding feature 88. As shown in FIG. 14, when the auxiliary member 50 is located at the second auxiliary position Q2, the auxiliary member 50 can support the first locking member 52 for retaining the first locking member 52 at the locking position J2. Besides, as shown in FIG. 14, when the auxiliary member 50 is located at the second auxiliary position Q2, the auxiliary member 50 can press the second locking member 54 for retaining the second locking member 54 at the locking position J2'. In addition, as shown in FIG. 14, during the aforementioned movement of the working member 48 from the first working position M1 to the second working position M2, the working member 48 is tilted, such that the working part 76 of the working member 48 disengages from the actuating part 74 of the second fitting member 36.

Preferably, during the movement of the working member 48 from the first working position M1 as shown in FIG. 12 to the second working position M2 as shown in FIG. 14, the auxiliary member 50 is driven by the working member 48 to move from the first auxiliary position Q1 as shown in FIG. 12 to the second auxiliary position Q2 as shown in FIG. 14.

It should be noticed that when the first drawer 22*a* is displaced from the extended position E toward the retracted position R along the second predetermined direction D2, e.g. the retracting direction, the second fitting member 36 can drive the auxiliary member 50 to move from the second auxiliary position Q2 to the first auxiliary position Q1 by the abutment of the first predetermined portion 78 of the second fitting member 36 and the second predetermined portion 80 of the auxiliary member 50, and the second fitting member 36 can further abut against another working part 130 of the working member 48 to disengage the supporting feature 64 of the working member 48 from the bending part 62 of the base 46, so as to return the working member 48 back to the first working position M1.

In short, as long as the second fitting member 36 is located at a position within the mounting range, e.g., the first mounting position K1 or the second mounting position K2, the second fitting member 36 moving along the predetermined direction D1 can drive the auxiliary member 50 to move from the first auxiliary position Q1 to the second auxiliary position Q2 for retaining the interlock mechanism 40 in the locking state, e.g., for retaining the first locking member 52 and the second locking member 54 at the locking positions J2, J2' respectively, so as to achieve the interlock function.

In conclusion, the present invention includes the following characteristics.

1. The furniture assembly can optionally have the interlock kit, e.g., the first interlock kit 32*a*, to achieve the interlock function according to practical demands.
2. Even if there is any assembly error on the first fitting member 34 and/or the second fitting member 36, due to the configuration of the predetermined gap G defined by the difference between the first predetermined height H1 of the first fitting member 34 and the second predetermined height H2 of the second fitting member 36 and/or the configuration of the difference between the extending length h1 of the actuating part 74 of the second fitting member 36 along the height direction and the extending length h2 of the working part 76 of the working member 48 along the height direction, the present invention ensures the second fitting member 36 to be moved inside the space S of the first fitting member 34 to ensure normal operation of the interlock mechanism 40 during the opening movement or the retracting movement of the first drawer 22*a* as long as the second fitting member 36 is located at a position within the mounting range, e.g., the first mounting position K1 or the second mounting position K2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A furniture assembly comprising:

a cabinet body;

a drawer displaceable relative to the cabinet body along a longitudinal direction; and an interlock kit comprising:

a first fitting member detachably mounted on the cabinet body, the first fitting member comprising a first wall, a second wall and a middle wall connected between the first wall and the second wall, the first wall, the second wall and the middle wall cooperatively defining a space of the first fitting member, and a first predetermined height being defined by a distance between the first wall and the second wall along a height direction;

a second fitting member detachably mounted on the drawer, and the second fitting member having a second predetermined height along the height direction;

an auxiliary device arranged on the first fitting member, the auxiliary device comprising:

a base mounted inside the space of the first fitting member;

a working member movable relative to the base; and an auxiliary member movable relative to the base; and an interlock mechanism arranged on the first fitting member, the interlock mechanism comprising at least one locking member;

wherein a predetermined gap is defined by a difference between the first predetermined height and the second predetermined height;

wherein when the second fitting member is mounted on the drawer at a mounting position within a mounting range defined by the predetermined gap and a position of the first fitting member and the drawer is displaced from a retracted position toward an extended position, the second fitting member drives the working member to move from a first working position to a second working position, so as to drive the auxiliary member to move from a first auxiliary position to a second auxiliary position to retain the at least one locking member at a locking position.

2. The furniture assembly of claim 1, wherein the second fitting member comprises an actuating part, the working member comprises a working part, and during a displacement of the drawer from the retracted position toward the extended position, the actuating part abuts against the working part for driving the working member to move from the first working position to the second working position.

3. The furniture assembly of claim 2, wherein an extending length of the actuating part along the height direction is different from an extending length of the working part along the height direction, when the second fitting member is mounted on the drawer at the mounting position within the mounting range defined by the predetermined gap and the position of the first fitting member, the actuating part is located at a position corresponding to the working part, and during the displacement of the drawer from the retracted position toward the extended position, the actuating part abuts against the working part for driving the working member to move from the first working position to the second working position.

4. The furniture assembly of claim 3, wherein one of the extending length of the actuating part along the height direction and the extending length of the working part along the height direction is greater than another one of the extending length of the actuating part along the height direction and the extending length of the working part along the height direction.

5. The furniture assembly of claim 3, wherein during a movement of the working member from the first working position to the second working position, the working member drives the auxiliary member to move from the first auxiliary position to the second auxiliary position.

6. The furniture assembly of claim 1, wherein the base is connected to the middle wall of the first fitting member, and the working member is movably mounted on the base.

7. The furniture assembly of claim 6, wherein the auxiliary member is arranged inside the space of the first fitting member.

8. The furniture assembly of claim 1, wherein when the drawer is displaced from the extended position toward the retracted position, the second fitting member drives the auxiliary member from the second auxiliary position back to the first auxiliary position.

9. The furniture assembly of claim 1, wherein the base comprises a longitudinal part and a bending part, the bending part extends and bends from the longitudinal part, and the working member comprises a supporting feature, such that the working member is movable along the longitudinal part and the bending part by the supporting feature.

10. A furniture assembly comprising:

a cabinet body;

a drawer displaceable relative to the cabinet body; and an interlock kit comprising:

a first fitting member arranged on the cabinet body;

a second fitting member detachably mounted on the drawer, the second fitting member comprising an actuating part;

an auxiliary device arranged on the first fitting member, the auxiliary device comprising:

a base;

a working member movable relative to the base, the working member comprising a working part; and an auxiliary member movable relative to the base; and an interlock mechanism arranged on the first fitting member, the interlock mechanism comprising at least one locking member;

wherein an extending length of the actuating part along a height direction is different from an extending length of the working part along the height direction for allowing the second fitting member to be mounted on the drawer at one of a first mounting position and a second mounting position, so as to locate the actuating part at a position corresponding to the working part;

wherein during a displacement of the drawer from a retracted position toward an extended position, the actuating part abuts against the working part for driving the working member to move from a first working position to a second working position, so as to drive the auxiliary member to move from a first auxiliary position to a second auxiliary position to retain the at least one locking member at a locking position.

11. The furniture assembly of claim 10, wherein one of the extending length of the actuating part along the height direction and the extending length of the working part along the height direction is greater than another one of the extending length of the actuating part along the height direction and the extending length of the working part along the height direction.

12. The furniture assembly of claim 10, wherein during a movement of the working member from the first working position to the second working position, the working member drives the auxiliary member to move from the first auxiliary position to the second auxiliary position.

13. The furniture assembly of claim 10, wherein the base is connected to the first fitting member, and the working member is movably mounted on the base.

14. The furniture assembly of claim 10, wherein the auxiliary member is arranged inside the first fitting member.

15. The furniture assembly of claim 10, wherein when the drawer is displaced from the extended position toward the retracted position, the second fitting member drives the auxiliary member from the second auxiliary position back to the first auxiliary position.

16. The furniture assembly of claim 10, wherein the base comprises a longitudinal part and a bending part, the bending part extends and bends from the longitudinal part, and the working member further comprises a supporting feature, such that the working member is movable along the longitudinal part and the bending part by the supporting feature.

17. The furniture assembly of claim 10, wherein the first fitting member comprises a first wall, a second wall and a middle wall connected between the first wall and the second wall, the first wall, the second wall and the middle wall cooperatively define a space of the first fitting member, and the base is located inside the space of the first fitting member.

18. The furniture assembly of claim 17, wherein the auxiliary member is located inside the space of the first fitting member.

19. A furniture assembly comprising:
a cabinet body;
a drawer displaceable relative to the cabinet body; and
a interlock kit adapted for the cabinet body and the drawer, the interlock kit comprising:
a first fitting member having a first predetermined dimension;
a second fitting member having a second predetermined dimension;
an auxiliary device arranged on the first fitting member, the auxiliary device comprising an auxiliary member; and
an interlock mechanism arranged on the first fitting member;
wherein a predetermined gap is defined by a difference between the first predetermined dimension and the second predetermined dimension;
wherein when the second fitting member is mounted on the drawer at a mounting position within a mounting range defined by the predetermined gap and a position of the first fitting member and the second fitting member is moved relative to the first fitting member along a predetermined direction, the auxiliary member is driven to move from a first auxiliary position to a second auxiliary position to retain the interlock mechanism in a locking state.

20. The furniture assembly of claim 19, wherein the auxiliary device further comprises a base connected to the first fitting member and a working member movably mounted on the base, and when the second fitting member is mounted on the drawer at the mounting position within the mounting range defined by the predetermined gap and the position of the first fitting member, an actuating part of the second fitting member is located at a position corresponding to a working part of the working member, such that during a movement of the second fitting member along the predetermined direction, the second fitting member drives the working member to move the auxiliary member from the first auxiliary position to the second auxiliary position to retain the interlock mechanism in the locking state.

* * * * *